(12) United States Patent
Okazawa et al.

(10) Patent No.: US 11,161,136 B2
(45) Date of Patent: Nov. 2, 2021

(54) LIQUID PROCESSING APPARATUS AND LIQUID PROCESSING METHOD

(71) Applicant: Tokyo Electron Limited, Tokyo (JP)

(72) Inventors: Tomoki Okazawa, Koshi (JP); Yuta Nishiyama, Koshi (JP); Takeshi Tobimatsu, Koshi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 0 days.

(21) Appl. No.: 16/857,376

(22) Filed: Apr. 24, 2020

(65) Prior Publication Data
US 2020/0338582 A1  Oct. 29, 2020

(30) Foreign Application Priority Data

Apr. 26, 2019 (JP) .............................. JP2019-086013

(51) Int. Cl.
| | |
|---|---|
| *B05B 15/55* | (2018.01) |
| *B05B 15/70* | (2018.01) |
| *B05B 15/50* | (2018.01) |
| *C03C 17/00* | (2006.01) |

(52) U.S. Cl.
CPC .............. *B05B 15/55* (2018.02); *B05B 15/50* (2018.02); *B05B 15/70* (2018.02); *C03C 17/002* (2013.01)

(58) Field of Classification Search
CPC ....... B05B 15/50; B05B 15/55; B05B 15/555; B05B 15/70; C03C 17/002; C03C 2218/31; C03C 2218/112; B08B 3/04; B08B 3/045; B08B 5/04; H01L 21/67017; H01L 21/6715; G03F 7/16

See application file for complete search history.

(56) References Cited

U.S. PATENT DOCUMENTS

| | | | | |
|---|---|---|---|---|
| 5,273,192 | A * | 12/1993 | Kamiya | B05B 15/50 222/152 |
| 5,958,517 | A * | 9/1999 | Poag | H01L 21/6715 427/424 |
| 6,159,291 | A * | 12/2000 | Morita | B05C 11/08 118/321 |
| 7,153,364 | B1 * | 12/2006 | Rangarajan | B05B 15/50 118/326 |

(Continued)

FOREIGN PATENT DOCUMENTS

JP          2010-186974 A      8/2010

*Primary Examiner* — Darren W Gorman
(74) *Attorney, Agent, or Firm* — Pearne & Gordon LLP

(57) ABSTRACT

A liquid processing apparatus includes a processing liquid supply including a nozzle configured to discharge a processing liquid; a nozzle mover configured to move the nozzle between a coating position and a standby position; a suction unit including a suction opening toward a leading end surface of the nozzle located at the standby position; a cleaning unit configured to clean the leading end surface of the nozzle located at the standby position with a cleaning liquid; and a control device. The control device controls the processing liquid supply to discharge the processing liquid in a state that the nozzle is located at the standby position. The control device controls the suction unit to suck the processing liquid. The control device controls the cleaning unit to supply the cleaning liquid toward the standby position to clean the nozzle. The control device controls the suction unit to suck the cleaning liquid.

7 Claims, 10 Drawing Sheets

(56) References Cited

U.S. PATENT DOCUMENTS

| | | | | |
|---|---|---|---|---|
| 9,508,569 | B2* | 11/2016 | Inoue | B05B 15/70 |
| 2001/0003966 | A1* | 6/2001 | Kitano | H01L 21/6715 |
| | | | | 118/70 |
| 2003/0216053 | A1* | 11/2003 | Miyata | H01L 21/67276 |
| | | | | 438/758 |
| 2013/0020284 | A1* | 1/2013 | Osada | H01L 21/67034 |
| | | | | 216/57 |
| 2014/0261557 | A1* | 9/2014 | Sotoku | H01L 21/67051 |
| | | | | 134/22.1 |
| 2017/0128962 | A1* | 5/2017 | Kashiyama | B05B 12/02 |
| 2018/0029059 | A1* | 2/2018 | Takahashi | B05C 11/08 |
| 2018/0061678 | A1* | 3/2018 | Miura | H01L 21/6715 |
| 2020/0038897 | A1* | 2/2020 | Kamimura | B05B 1/3093 |

* cited by examiner

LIQUID PROCESSING APPARATUS AND LIQUID PROCESSING METHOD

CROSS-REFERENCE TO RELATED APPLICATION

This application claims the benefit of Japanese Patent Application No. 2019-086013 filed on Apr. 26, 2019, the entire disclosure of which is incorporated herein by reference.

TECHNICAL FIELD

The various aspects and embodiments described herein pertain generally to a liquid processing apparatus and a liquid processing method.

BACKGROUND

Patent Document 1 describes a liquid processing apparatus including a plurality of liquid processing units each of which is equipped with a substrate holder provided within a cup body and configured to hold a substrate horizontally; a processing liquid nozzle configured to supply a processing liquid onto a substrate; and a liquid removing unit configured to remove a liquid droplet of the processing liquid falling from the processing liquid nozzle between openings of the cup body.

Patent Document 1: Japanese Patent Laid-open Publication No. 2010-186974

SUMMARY

In one exemplary embodiment, a liquid processing apparatus includes a processing liquid supply including a nozzle configured to discharge a processing liquid; a nozzle mover configured to move the nozzle between a coating position where the processing liquid is supplied toward a front surface of a substrate and a standby position different from the coating position; a suction unit including a suction opening opened toward a leading end surface of the nozzle located at the standby position; a cleaning unit configured to clean the leading end surface of the nozzle located at the standby position with a cleaning liquid; and a control device configured to control the processing liquid supply, the nozzle mover, the suction unit and the cleaning unit. The control device controls the processing liquid supply to discharge the processing liquid from the nozzle in a state that the nozzle is located at the standby position. The control device controls the suction unit to perform suction of the processing liquid which is discharged from the nozzle located at the standby position. The control device controls the cleaning unit to supply the cleaning liquid toward the standby position to clean the nozzle which is located at the standby position. The control device controls the suction unit to suck the cleaning liquid which is supplied toward the standby position by the cleaning unit.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
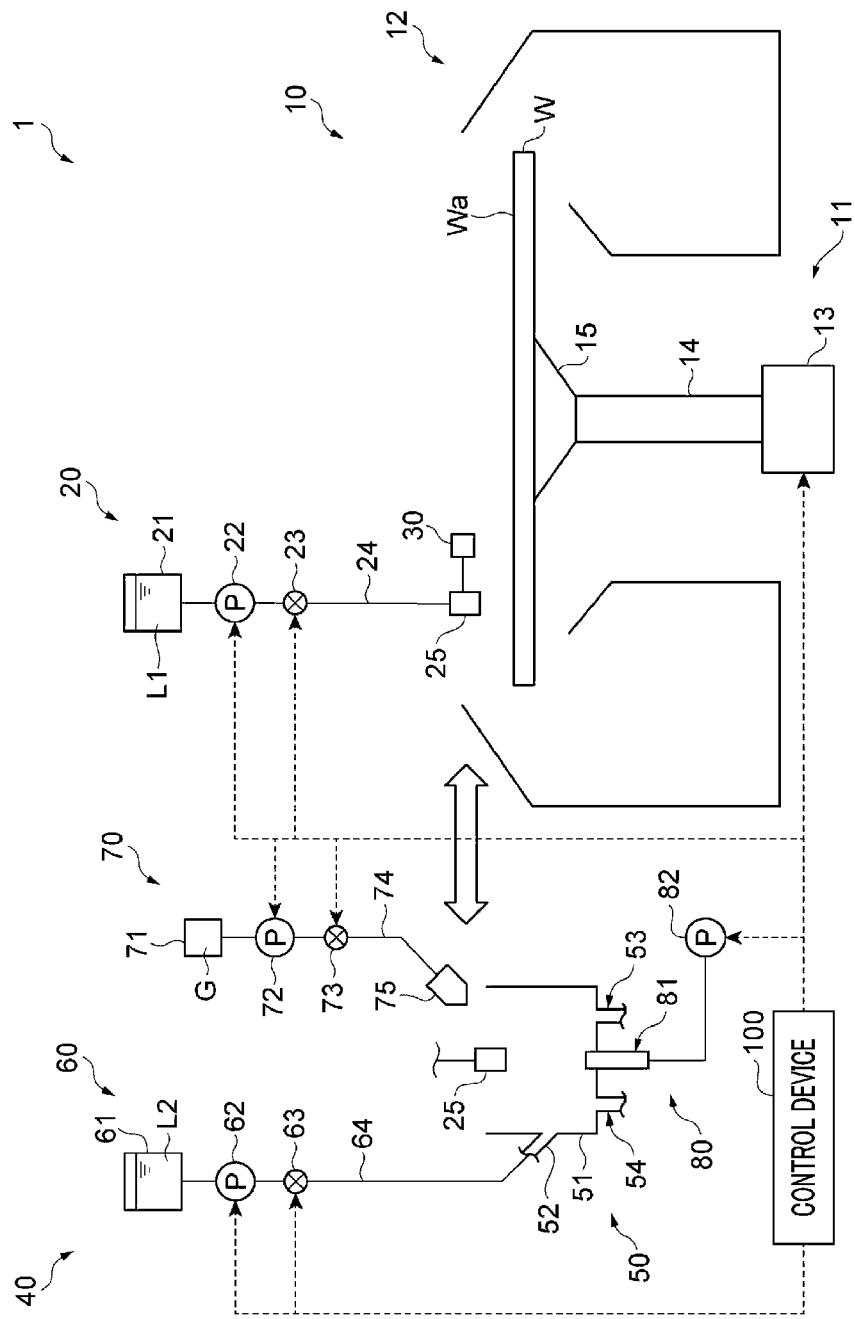
FIG. 1 is a diagram illustrating an example of a schematic configuration of a liquid processing apparatus.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, various exemplary embodiments for a substrate processing apparatus of the present disclosure will be described in detail with reference to the accompanying drawings. In the following description, same parts will be assigned same reference numerals, and redundant description will be omitted.

[Liquid Processing Apparatus]

Figure 2:
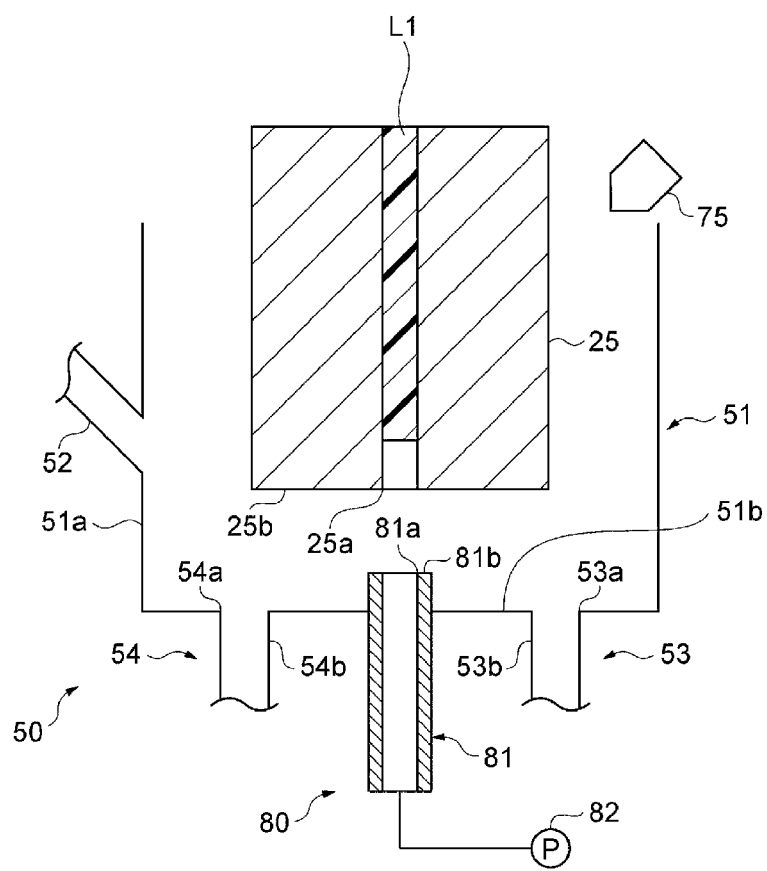
FIG. 2 is a schematic cross sectional view illustrating an example of a cleaning unit and a suction unit.
Figure 3:
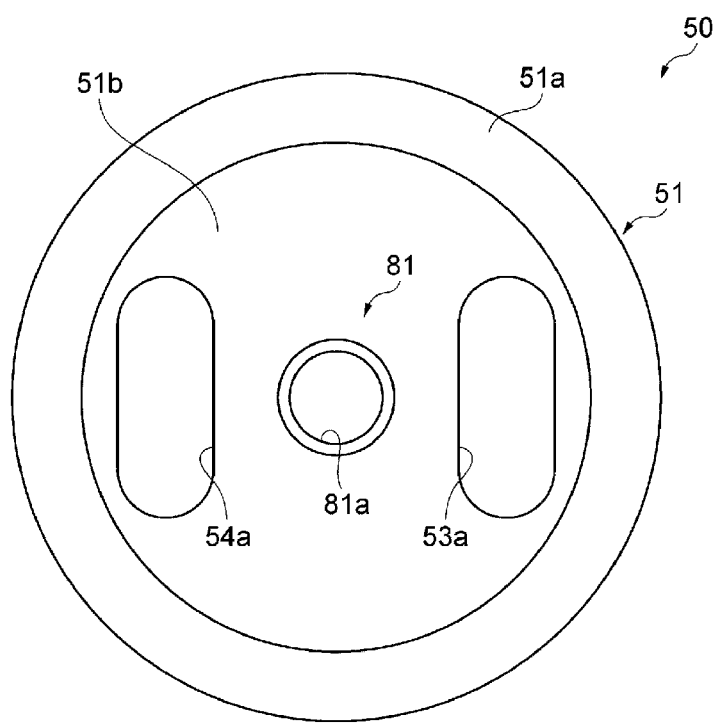
FIG. 3 is a schematic diagram illustrating an example of a configuration of a liquid recovery member when viewed from the top.

Referring to FIG. 1 to FIG. 3, a configuration of a liquid processing apparatus 1 will be described. The liquid processing apparatus 1 is configured to supply a processing liquid L1 onto a front surface Wa of a wafer W (substrate), as illustrated in FIG. 1. The processing liquid L1 may be any of various kinds of liquids capable of being supplied to the front surface Wa of the wafer W. By way of example, the processing liquid L1 may be a photosensitive resist liquid for forming a photosensitive resist film, a non-photosensitive resist liquid for forming a non-photosensitive resist film, a developing liquid for performing a developing processing on a resist film, or the like.

The wafer W may have a circular plate shape, or a plate shape other than a circle (for example, a polygonal shape).

The wafer W may have a notch portion where a part of the wafer W is notched. For example, this notch portion may be a notch (a groove having a U-shape, a V-shape, or the like), or a straight-line portion (a so-called orientation flat) extending in a straight light shape. The wafer W may be, by way of example, but not limitation, a semiconductor substrate, a glass substrate, a mask substrate, a FPD (Flat Panel Display) substrate, or any of various kinds of substrates. The wafer W may have a diameter ranging from, e.g., 200 mm to 450 mm.

The liquid processing apparatus 1 is equipped with a substrate holder 10, a processing liquid supply 20, a driving device 30 (nozzle mover), a cleaning unit 40, a suction unit 80, and a control device 100.

The substrate holder 10 is equipped with a rotary holder 11 and a cup 12. The rotary holder 11 has a rotator 13, a shaft 14 and a holder 15. The rotator 13 is operated based on an operational signal from the control device 100 is configured to rotate the shaft 14. The rotator 13 is, for example, a power source such as an electric motor. The holder 15 is provided on a leading end of the shaft 14. The wafer W is placed on the holder 15. The holder 15 is, for example, a suction chuck configured to hold the wafer W substantially horizontally by, for example, suction.

That is, the rotary holder 11 has a function of rotating the wafer W about an axis (rotation axis) which is perpendicular to the front surface Wa of the wafer W, while holding the wafer W substantially horizontally. In the present exemplary embodiment, since the rotation axis passes through a center of the wafer W having the circular shape, the rotation axis also serves as a center axis.

The cup 12 is disposed around the rotary holder 11. The cup 12 serves as a liquid recovery receptacle configured to receive a liquid supplied onto the wafer W to process the wafer W. The cup 12 may be made of, by way of non-limiting example, polypropylene (PP), poly vinylchloride (PVC), a poly phenylene sulfide (PPS) resin, or the like.

The processing liquid supply 20 is configured to supply the processing liquid L1 onto the front surface Wa of the wafer W. The processing liquid supply 20 includes a liquid source 21, a pump 22, a valve 23, a pipeline 24, and a nozzle 25.

The liquid source 21 serves as a source for the processing liquid L1. The pump 22 is operated based on an operational signal from the control device 100, and is configured to suck the processing liquid L1 from the liquid source 21 and to send the processing liquid L1 from the liquid source 21 into the nozzle 25 through the pipeline 24 and the valve 23. The valve 23 is operated based on an operational signal from the control device 100, and opens/closes the pipeline 24 at an upstream and a downstream of the valve 23. The pipeline 24 connects the liquid source 21, the pump 22, the valve 23 and the nozzle 25 in sequence from the upstream side.

The nozzle 25 is configured to discharge the processing liquid L1. To elaborate, the nozzle 25 has a function of discharging, from a discharge opening 25a (see FIG. 2), the processing liquid L1 sent from the pump 22 downwards. The discharge opening 25a is provided at a leading end surface 25b of the nozzle 25. The leading end surface 25b is, for example, a bottom end surface located at a bottom end of the nozzle 25. The leading end surface 25b may be flat. By way of example, the leading end surface 25b may be horizontally disposed. Alternatively, the leading end surface 25b may be inclined with respect to the horizontal direction. The leading end surface 25b may be partially notched. The discharge opening 25a may have a circular shape or a polygonal shape when viewed from the vertical direction (from below). A flow path led to the discharge opening 25a is provided within the nozzle 25. This flow path within the nozzle 25 may have a substantially uniform diameter. Alternatively, the diameter of the flow path within the nozzle 25 may be enlarged near the discharge opening 25a.

The driving device 30 is operated based on an operational signal from the control device 100 and is configured to move the nozzle 25 in the horizontal direction or an up-and-down direction. The driving device 30 may be, by way of non-limiting example, a servo-motor equipped with an encoder, and may control a moving speed and a moving position of the nozzle 25. The driving device 30 moves the nozzle 25 between a coating position for supplying the processing liquid L1 toward the front surface Wa of the wafer W and a standby position different from the coating position.

The coating position is a position allowing the processing liquid L1 discharged from the discharge opening 25a of the nozzle 25 to attach to the front surface Wa of the wafer W. By way of example, when viewed from the top, the coating position is a single position within a region formed by an edge of the cup 12. Alternatively, when viewed from the top, the coating position is a single position within a region formed by an edge of the wafer W held by the holder 15. The standby position is a position for performing preparation (maintenance of the nozzle 25) for supplying the processing liquid L1 toward the front surface Wa of the wafer W. The standby position is, for example, a single position at an outside of the region formed by the edge of the wafer W, when viewed from the top. Alternatively, the standby position is a single position at an outside of the region formed by the edge of the cup 12, when viewed from the top. In the present specification, a discharge of the processing liquid L1 toward the front surface Wa of the wafer W from the nozzle 25 located at the coating position is referred to as "main discharging." Further, a discharge of the processing liquid L1 from the nozzle 25 located at the standby position toward a place other than the wafer W, which is performed for preparation of the main discharging, is referred to as "dummy discharging." Further, the driving device 30 may move the nozzle 25 between the center of the wafer W and the edge of the wafer W when the main discharging is performed.

The cleaning unit 40 is configured to clean the leading end surface 25b of the nozzle 25 at the standby position with the cleaning liquid L2. The cleaning unit 40 is equipped with a liquid recovery unit 50 and a cleaning liquid supply 60.

The liquid recovery unit 50 serves as a liquid recovery receptacle configured to receive the processing liquid L1 and the cleaning liquid L2 when the dummy discharging is performed. The liquid recovery unit 50 includes, as illustrated in FIG. 1 and FIG. 2, a cleaning tub 51 and a nozzle 52. The cleaning tub 51 is provided at the standby position. As stated above, in case that the standby position is located at the outside of the region formed by the edge of the cup 12, the cleaning tub 51 is placed at an outside of the cup 12. The cleaning tub 51 is a cylindrical housing having an open top and a closed bottom. As depicted in FIG. 2 and FIG. 3, the cleaning tub 51 has a sidewall 51a and a bottom wall 51b.

The nozzle 52 is provided at the sidewall 51a of the cleaning tub 51, and configured to discharge a cleaning liquid L2 into the cleaning tub 51. The nozzle 52 may be configured such that a vortex flow is formed within the cleaning tub 51 by the discharged cleaning liquid L2. By way of example, when viewed from the vertical direction, an opening direction of a discharge opening of the nozzle 52 (a discharging direction of the cleaning liquid L2 from the nozzle 52) may extend along a circumferential direction about a substantially center of the bottom wall 51b.

The cleaning liquid supply 60 is configured to supply the cleaning liquid L2 into the cleaning tub 51. The cleaning liquid L2 may be any of various kinds of organic solvents (for example, thinner). The cleaning liquid supply 60 is equipped with a liquid source 61, a pump 62, a valve 63 and a pipeline 64.

The liquid source 62 serves as a source for the cleaning liquid L2. The pump 62 is operated based on an operational signal from the control device 100, and is configured to send the cleaning liquid L2 from the liquid source 61 into the nozzle 52 through the pipeline 64 and the valve 63. The valve 63 is operated based on an operational signal from the control device 100, and opens/closes the pipeline 64 at an upstream and a downstream of the valve 63. The pipeline 64 connects the liquid source 61, the pump 62, the valve 63 and the nozzle 52 in sequence from the upstream side.

The cleaning unit 40 may be further equipped with a gas supply 70. The gas supply 70 is configured to supply a gas toward a lower end portion of the nozzle 25. The gas G may be any of various kinds of inert gases, for example, a nitrogen gas ($N_2$ gas). The gas supply 70 is equipped with a gas source 71, a pump 72, a valve 73, a pipeline 74 and a nozzle 75.

The gas source 71 serves as a source for the gas G. The pump 62 is operated based on an operational signal from the control device 100, and is configured to send the gas G from the gas source 71 into the nozzle 75 through the pipeline 74 and the valve 73. The valve 73 is operated based on an operational signal from the control device 100 and opens/closes the pipeline 74 at an upstream and a downstream of the valve 73.

The pipeline 74 connects the gas source 71, the pump 72, the valve 73 and the nozzle 75 in sequence from the upstream side. The nozzle 75 is fixed within the cleaning tub 51 such that a discharge opening at a leading end thereof is oriented diagonally downwards. The nozzle 75 has a function of discharging the gas G, which is sent from the gas source 71, from the discharge opening diagonally downwards. Further, in the example shown in FIG. 1, the gas supply 70 supplies the gas into the cleaning tub 51. However, the gas supply 70 may be configured to supply the gas into a water tub other than the cleaning tub 51. In such a case, the nozzle 75 may discharge the gas toward the nozzle 25 which is located within this water tub.

The suction unit 80 is configured to suck the processing liquid L1 and the cleaning liquid L2. The suction unit 80 have a suction head 81 and a suction device 82. The suction head 81 is a rod-shaped body extending in the vertical direction. The suction head 81 may be formed to have a circular column shape or a polygonal column shape. The suction head 81 has, at a leading end surface 81b (top surface) thereof, a suction opening 81a through which the processing liquid L1 or the cleaning liquid L2 is sucked. The suction opening 81a is opened toward the leading end surface 25b of the nozzle 25 which is located at the standby position. In this example, the leading end surface 81b of the suction head 81 faces the leading end surface 25b of the nozzle 25 which is placed at the standby position, and the suction opening 81a is opened toward the leading end surface 25b. The leading end surface 81b may be flat. The leading end surface 81b may be horizontal or inclined with respect to the horizontal direction. A flow path led to the suction opening 81a is provided within the suction head 81. This flow path extends along the vertical direction. This flow path may have a substantially uniform diameter. Alternatively, the diameter of the flow path within the suction head 81 may be enlarged near the suction opening 81a.

As shown in FIG. 2, the suction head 81 is disposed such that the suction opening 81a is located within the cleaning tub 51. As depicted in FIG. 3, the suction head 81 may be disposed such that the suction opening 81a is located at a substantially center of the bottom wall 51b when viewed from the top. The suction head 81 may be protruded upwards above an inner surface of the bottom wall 51b of the cleaning tub 51. That is, a height position of the leading end surface 81b of the suction head 81 may be higher than the inner surface of the bottom wall 51b. The suction head 81 may be fixed to the cleaning tub 51. By way of example, the suction head 81 may be fixed to the bottom wall 51b in the state that it penetrates the bottom wall 51b of the cleaning tub 51 in the vertical direction. Further, the suction head 81 may not be protruded above the bottom wall 51b of the cleaning tub 51. By way of example, the leading end surface 81b of the suction head 81 may be on a level with the bottom wall 51b. The suction head 81 may not be fixed to the bottom wall 51b of the cleaning tub 51 but be fixed to the sidewall 51a. The suction head 81 may be provided at a position apart from the sidewall 51a and the bottom wall 51b. In this case, the suction head 81 may be fixed to the cleaning tub 51 with a fixing member.

When viewed from the vertical direction (from above), the suction opening 81a may be of a circular shape or a polygonal shape. When viewed from the vertical direction, a size (area) of the suction opening 81a may be substantially equal to a size of the discharge opening 25a of the nozzle 25, smaller than the size of the discharge opening 25a, or larger than the size of the discharge opening 25a. For example, a diameter of the suction opening 81a may be 0.7 times to 1.3 times as large as a diameter of the discharge opening 25a. Alternatively, the diameter of the suction opening 81a may be 0.75 times to 1.25 times larger than the diameter of the discharge opening 25a. In case that both the suction opening 81a and the discharge opening 25a have the circular shapes, the diameter of the suction opening 81a may be 0.7 times to 1.3 times or 0.75 times to 1.25 times as large as the diameter of the discharge opening 25a.

The suction device 82 is connected to a lower end of the suction head 81. The suction device 82 is a pump configured to perform a suction operation to suck the processing liquid L1 or the cleaning liquid L2 from the suction opening 81a. The suction device 82 performs the suction operation based on an operational signal of the control device 100.

The liquid recovery unit 50 may be further provided with liquid drains 53 and 54 (see FIG. 2). The liquid drains 53 and 54 are configured to drain the processing liquid L1 and the cleaning liquid L2 supplied into the cleaning tub 51. The liquid drains 53 and 54 may be provided at the bottom wall 51b. The liquid drain 53 (54) has a liquid drain opening 53a (54a) opened within the cleaning tub 51 and a liquid drain pipe 53b (54b) extending downwards from the bottom wall 51b. An accommodation space within the cleaning tub 51 is connected to a space (for example, an inside of a liquid drain tub) outside the cleaning tub 51 through the liquid drain openings 53a and 54a and flow paths within the liquid drain pipes 53b and 54b. Accordingly, the cleaning liquid L2 within the cleaning tub 51 is drained out from the cleaning tub 51 through the liquid drain openings 53a and 54a.

The liquid drain openings 53a and 54a are provided around the suction opening 81a which is located at the substantially center of the bottom wall 51b. For example, as illustrated in FIG. 3, when viewed from the top, the liquid drain openings 53a and 54a are arranged with the suction opening 81a therebetween. The liquid drain openings 53a and 54a may extend along a circumferential direction about the substantially center of the bottom wall 51b. When viewed from the vertical direction, a size (area) of the liquid drain opening 53a and a size (area) of the liquid drain opening 54a may be smaller than the size of the suction opening 81a. Further, a single liquid drain opening may be provided at the bottom wall 51b of the cleaning tub 51, or more than two liquid drain openings may be provided. The size of the liquid drain opening(s) provided at the bottom wall 51b may be substantially equal to the size of the suction opening 81a or smaller than that. Furthermore, no liquid drain opening may be provided at the bottom wall 51b, and the cleaning liquid L2 within the cleaning tub 51 may be drained by the suction unit 80.

The control device 100 controls the individual components of the liquid processing apparatus 1. The control device 100 is configured to control the processing liquid supply 20 to discharge the processing liquid L1 form the nozzle 25 in the state that the nozzle 25 is located at the standby position, control the suction unit 80 to suck the processing liquid L1 which is discharged from the nozzle 25 located at the standby position, control the cleaning unit 40 to supply the cleaning liquid L2 toward the standby position to clean the nozzle 25 which is located at the standby position, and control the suction unit 80 to suck the cleaning liquid L2 which is supplied to the standby position by the cleaning unit 40.

Figure 4:
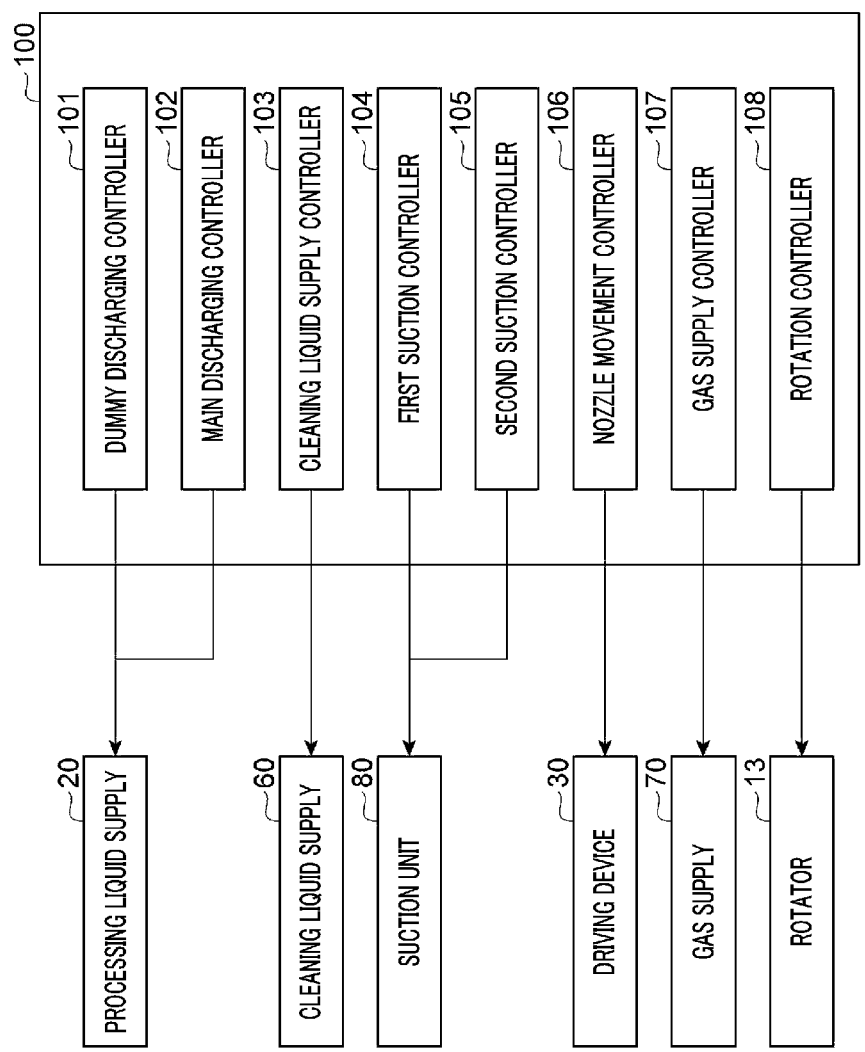
FIG. 4 is a block diagram illustrating an example of a functional configuration of a control device.

As depicted in FIG. 4, the control device 100 includes, as functional modules, a dummy discharging controller 101, a main discharging controller 102, a cleaning liquid supply controller 103, a first suction controller 104, a second suction controller 105, a nozzle movement controller 106, a gas supply controller 107 and a rotation controller 108.

The dummy discharging controller 101 has a function of controlling the processing liquid supply 20 to discharge the processing liquid L1 from the nozzle 25 at the standby position. To elaborate, when the nozzle 25 is located at the standby position (within the cleaning tub 51), the dummy discharging controller 101 controls the pump 22 and the valve 23 of the processing liquid supply 20 to discharge (dummy-discharge) the processing liquid L1 from the nozzle 25 toward the suction opening 81a of the suction head 81.

The main discharging controller 102 has a function of controlling the processing liquid supply 20 to discharge the processing liquid L1 from the nozzle 25 which is located at the coating position. To elaborate, when the nozzle 25 is located at the coating position, the main discharging controller 102 controls the pump 22 and the valve 23 of the processing liquid supply 20 to discharge (main-discharge) the processing liquid L1 onto the front surface Wa of the wafer W from the nozzle 25.

The cleaning liquid supply controller 103 has a function of controlling the cleaning liquid supply 60 to supply the cleaning liquid L2 to the standby position from the nozzle 52. To be specific, the cleaning liquid supply controller 103 controls the pump 62 and the valve 63 of the cleaning liquid supply 60 to supply the cleaning liquid L2 into the cleaning tub 51 in the state that the nozzle 25 is accommodated within the cleaning tub 51. The cleaning liquid supply controller 103 controls the cleaning liquid supply 60 to supply the cleaning liquid L2 into the cleaning tub 51 to the extent that the leading end 25b of the nozzle 25 is immersed in the cleaning liquid L2 within the cleaning tub 51.

The first suction controller 104 has a function of controlling the suction unit 80 to suck the processing liquid L1 discharged from the nozzle 25 which is located at the standby position. To elaborate, when the dummy discharging is performed from the nozzle 25, the first suction controller 104 controls the suction device 82 to allow the processing liquid L1 discharged from the nozzle 25 to be sucked by the suction unit 80. In such a case, the processing liquid L1 dummy-discharged from the nozzle 25 is sucked through the suction opening 81a and the flow path within the suction head 81 connected to the suction opening 81a.

The second suction controller 105 has a function of controlling the suction unit 80 to suck the cleaning liquid L2 which is supplied into the cleaning tub 51. To elaborate, when the cleaning liquid L2 is supplied into the cleaning tub 51, the second suction controller 105 controls the suction device 82 to allow the cleaning liquid L2 within the cleaning tub 51 to be sucked by the suction unit 80. In this case, the cleaning liquid L2 supplied into the cleaning tub 51 is sucked through the suction opening 81a and the flow path within the suction head 81 to be drained out to an outside of the cleaning tub 51.

The nozzle movement controller 106 has a function of controlling the driving device 30 to move the nozzle 25 between the coating position and the standby position. By way of example, the nozzle movement controller 106 controls the driving device 30 to move the nozzle 25 from the standby position to the coating position before the main discharging from the nozzle 25 is performed and after the dummy discharging from the nozzle 25 is carried out. The nozzle movement controller 106 controls the driving device 30 to move the nozzle 25 from the coating position to the standby position before cleaning of the nozzle 25 is performed and after the main discharging from the nozzle 25 is carried out. When the main discharging from the nozzle 25 is performed, the nozzle movement controller 106 may control the driving device 30 to move the nozzle 25 in a direction along the front surface Wa of the wafer W. For example, while the main discharging from the nozzle 25 onto the surface Wa of the wafer W being rotated is being performed, the nozzle movement controller 106 may control the driving device 30 to move the nozzle 25 between the center axis of the wafer W and the edge of the wafer W.

The gas supply controller 107 has a function of controlling the gas supply 70 to discharge the gas G toward the leading end surface 25b of the nozzle 25 from the nozzle 75. To elaborate, when the nozzle 25 is located at the standby position (within the cleaning tub 51), the gas supply controller 107 controls the pump 72 and the valve 73 of the gas supply 70 to discharge the gas G toward the leading end surface 25b of the nozzle 25 from the nozzle 75. Accordingly, in case that a deposit is attached to the leading end surface 25b of the nozzle 25, the gas G is jetted to this deposit.

The rotation controller 108 has a function of controlling the rotator 13 to rotate the wafer W held by the holder 15 at a preset rotation number. As an example, the rotation controller 108 may drive the rotator 13 to rotate the wafer W while the main discharging from the nozzle 25 is being performed by the main discharging controller 102.

Figure 5:
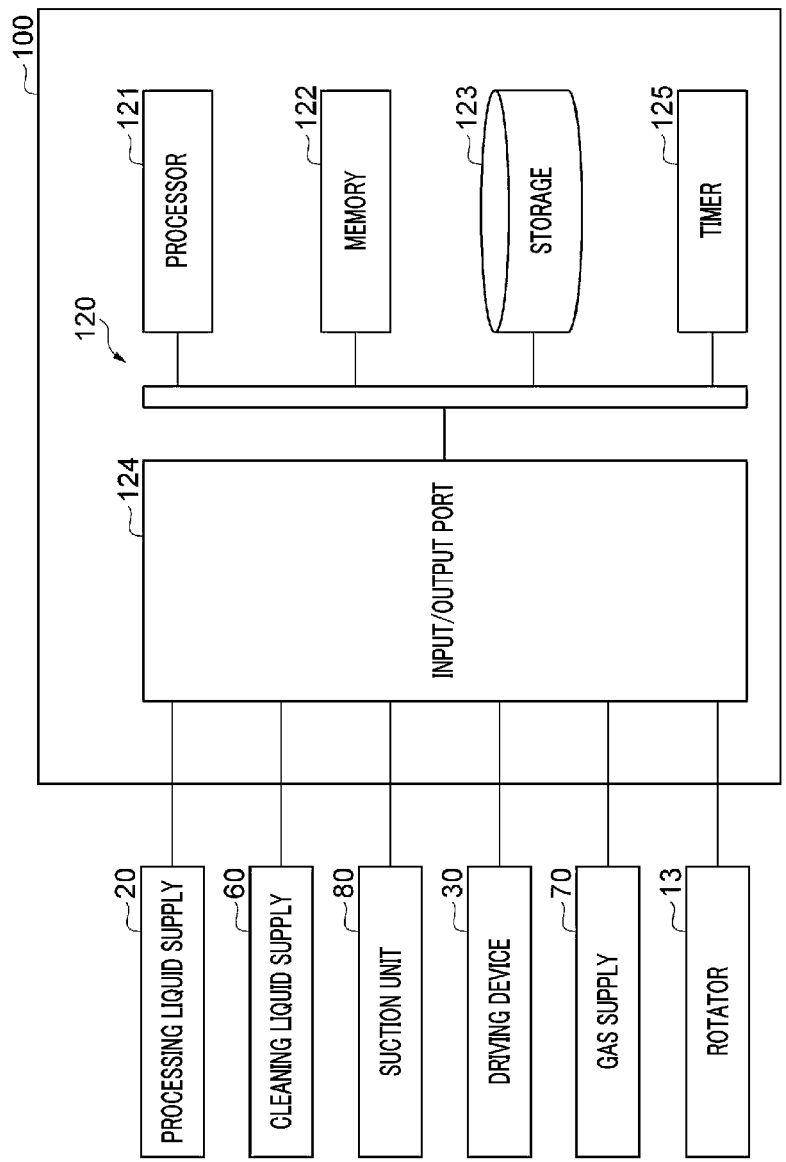
FIG. 5 is a block diagram illustrating an example of a hardware configuration of the control device.

The control device 100 is composed of one or more control computers. For example, the control device 100 has a circuit 120 shown in FIG. 5. The circuit 120 is equipped with one or more processors 121, a memory 122, a storage 123, an input/output port 124 and a timer 125. The storage 123 has a computer-readable recording medium such as, but not limited to, a hard disk. The recording medium stores therein programs that cause the control device 100 to carry out a liquid processing sequence to be described later. The recording medium may be a computer-readable medium such as a non-volatile semiconductor memory, a magnetic disk or an optical disk. The memory 122 temporarily stores therein the programs loaded from the recording medium of the storage 123 and an operation result by the processors 121. The processor 121 executes the programs in cooperation with the memory 122, thus constituting the above-described individual functional modules. The input/output port 124 performs an input/output of an electric signal between control target members in response to an instruction from the processor 121. The timer 125 measures an elapsed time by, for example, counting a reference pulse of a regular cycle.

Further, the hardware configuration of the control device 100 is not limited to constituting the individual functional modules by the programs. By way of example, each functional module of the control device 100 may be implemented by a dedicated logic circuit or an ASIC (Application Specific Integrated Circuit) which is an integration of logic circuits.

[Liquid Processing Sequence]

Now, with reference to FIG. 6 to FIG. 10D, the liquid processing sequence which is carried out by the liquid processing apparatus 1 will be discussed as an example of a liquid processing method.

Figure 6:
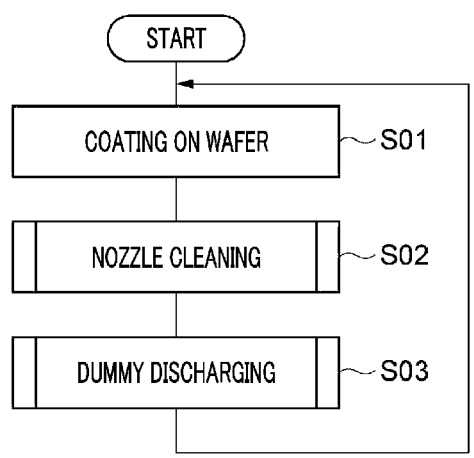
FIG. 6 is a flowchart illustrating an example of a liquid processing sequence.

As shown in FIG. 6, in the liquid processing sequence, the controller 100 first performs a process S01. In the process S01, the control device 100 controls the individual components of the liquid processing apparatus 1 to supply the processing liquid L1 onto the front surface Wa of the wafer W. To be more specific, in the process S01, the nozzle movement controller 106 first controls the driving device 30 to move the nozzle 25 such that the nozzle 25 is placed at the coating position. Then, the main discharging controller 102 controls the processing liquid supply 20 (the pump 22 and the valve 23) to discharge (main-discharge) the processing liquid L1 toward the front surface Wa of the wafer W from the nozzle 25. At this time, the rotation controller 108 controls the rotator 13 to rotate the wafer W held by the holder 15 at the preset rotation number. Accordingly, the processing liquid L1 is coated on the front surface Wa of the wafer W.

Subsequently, the control device 100 performs a process S02 and a process S03. In the process S02, the control device 100 controls the driving device 30, the cleaning unit 40 and the suction unit 80 to clean the nozzle 25. Details of a cleaning sequence in the process S02 will be elaborated later. In the process S03, the control device 100 controls the processing liquid supply 20, the driving device 30 and the suction unit 80 to allow the processing liquid L1 to be dummy-discharged from the nozzle 25 and to allow the dummy-discharged processing liquid L1 to be sucked through the suction opening 81*a*. Details of a dummy discharging sequence in the process S03 will be explained later. The control device 100 repeats the processes S01 to S03.

Figure 8A:
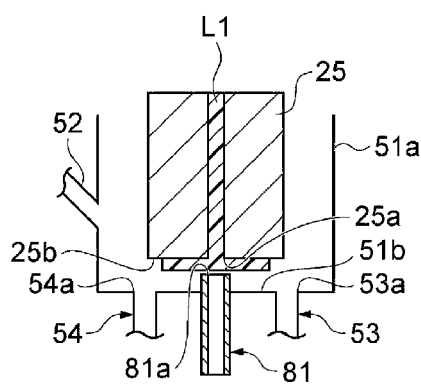
FIG. 8A to FIG. 8D are schematic diagrams for describing nozzle cleaning.

When the coating of the processing liquid L1 is performed in the process S01 (or upon the completion of the coating), the processing liquid L1 may be attached to the leading end surface 25*b* of the nozzle 25 (see FIG. 8A). By way of example, if the processing liquid L1 is discharged toward the surface Wa of the wafer W in the state that the leading end surface 25*b* of the nozzle 25 is placed near the surface Wa, the processing liquid L1 may easily adhere to the leading end surface 25*b*. Here, "near" refers to a state where the leading end surface 25*b* is not in contact with the surface Wa but slightly distanced apart from the surface Wa. A distance between the leading end surface 25*b* and the surface Wa may be, e.g., 0.01 mm to 2.0 mm. To remove the processing liquid L1 attached to the leading end surface 25*b*, the cleaning sequence in the process S02 is performed.

When the cleaning of the nozzle 25 is performed in the process S02, the cleaning liquid L2 supplied to the lower end portion of the nozzle 25 may be slightly introduced into the nozzle 25 from the discharge opening 25*a*. Further, this cleaning liquid L2 introduced into the nozzle 25 may remain after a series of processes of the cleaning sequence is performed (see FIG. 8D). To remove this cleaning liquid L2 left within the nozzle 25, the dummy discharging sequence in the process S03 is performed at the standby position. As stated above, as the processes S02 and S03 are performed after the coating of the processing liquid L1 from the nozzle 25, the coating of the processing liquid L1 in the process S01 is performed again in the state that the processing liquid L1 is removed from the leading end surface 25*b* of the nozzle 25 and the cleaning liquid L2 is removed from the inside of the nozzle 25. As the processes S01 and S03 are repeated, the dummy discharging sequence of the process S03 is performed before the process S01 is performed each time.

[Cleaning Sequence]

Figure 7:
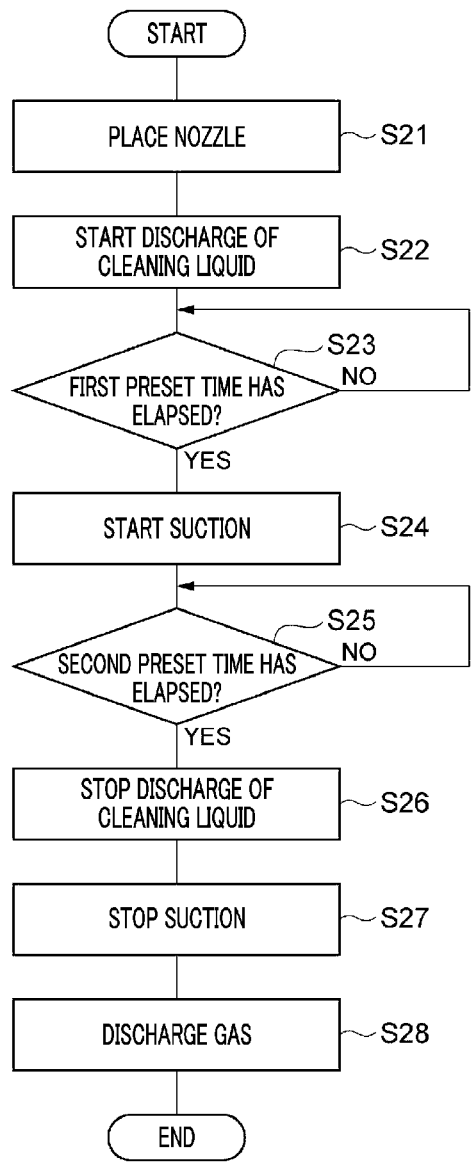
FIG. 7 is a flowchart illustrating an example of a cleaning sequence for a nozzle.

As depicted in FIG. 7, in the cleaning sequence of the process S02, the control device 100 performs a process S21 after the processing liquid L1 is coated on the surface Wa of the wafer W. In the process S21, the nozzle movement controller 106 controls the driving device 30 to move the nozzle 25 from the coating position to the standby position, so that the nozzle 25 is located at the standby position. By way of example, the nozzle movement controller 106 controls the driving device 30 to place the nozzle 25 within the cleaning tub 51 such that the leading end surface 25*b* of the nozzle 25 faces the leading end surface 81*b* of the suction head 81.

Figure 8B:
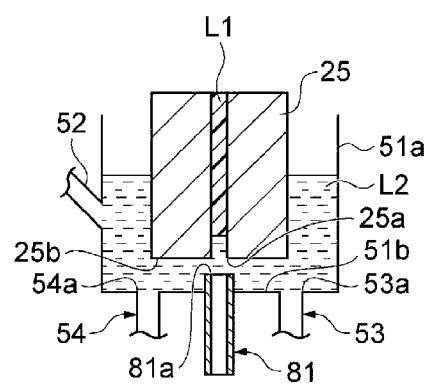

Subsequently, the control device 100 performs a process S22 and a process S23. In the process S22, the cleaning liquid supply controller 103 controls the cleaning liquid supply 60 to start a discharge of the cleaning liquid L2 from the nozzle 52 which is provided at the sidewall 51*a* of the cleaning tub 51. In the process S23, the control device 100 stands by until a first preset time elapses. Accordingly, as shown in FIG. 8B, the cleaning liquid L2 is supplied into the cleaning tub 51. During a period until the first preset time passes by after the discharge of the cleaning liquid L2 from the nozzle 52 is begun, the nozzle 52 keeps on supplying the cleaning liquid L2 into the cleaning tub 51.

At this time, while the cleaning liquid L2 is being supplied into the cleaning tub 51, a part of the cleaning liquid L2 supplied into the cleaning tub 51 is drained to the outside of the cleaning tub 51 through the drain openings 53*a* and 54*a*. Thus, the cleaning liquid supply controller 103 may control the cleaning liquid supply 60 to continue to supply the cleaning liquid L2 from the nozzle 52 such that a height of a liquid surface of the cleaning liquid L2 within the cleaning tub 51 is maintained higher than the leading end surface 25*b* of the nozzle 25. As these processes S22 and S23 are performed, the processing liquid L1 adhering to the leading end surface 25*b* (around the discharge opening 25*a*) of the nozzle 25, if any, is removed by the cleaning liquid L2 (see FIG. 8B).

Figure 8C:
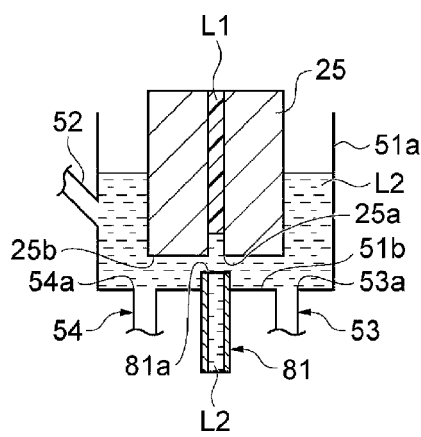

Thereafter, the control device 100 performs processes S24 and S25. In the process S24, the second suction controller 105 controls the suction device 82 to suck the cleaning liquid L2 supplied into the cleaning tub 51 through the suction opening 81*a* (through the flow path within the suction head 81). In the process S25, the control device 100 stands by until a second preset time passes by. Accordingly, the cleaning liquid L2 is sucked into the suction head 81 from the suction opening 81*a*, as shown in FIG. 8C. At this time, if there exists the processing liquid L1 attached within the suction head 81 when the dummy discharging is performed to an inner surface of the flow path within the suction head 81, the attached processing liquid L1 is removed by the cleaning liquid L2. As stated above, the control device 100 first performs the processing of supplying the cleaning liquid L2 into the cleaning tub 51 by the cleaning unit 40 in the state that the suction operation of the suction unit 80 is stopped. Then, the control device 100 performs the processing of sucking the cleaning liquid L2 within the cleaning tub 51 by the suction unit 80 while supplying the cleaning liquid L2 into the cleaning tub 51 by the cleaning unit 40.

Figure 8D:
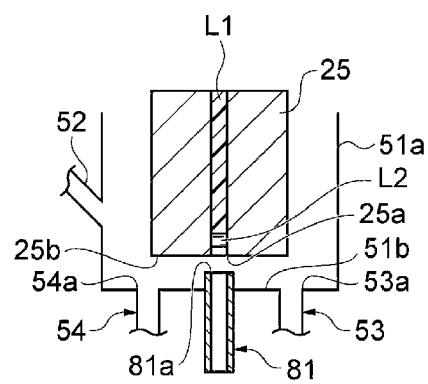

Afterwards, the control device 100 performs a process S26. In the process S26, the cleaning liquid supply controller 103 controls the pump 62 and the valve 63 of the cleaning liquid supply 60 to stop the discharge of the cleaning liquid L2 from the nozzle 52. Accordingly, the supply of the cleaning liquid L2 into the cleaning tub 51 from the nozzle 52 is stopped. The cleaning liquid L2 left within the cleaning tub 51 is drained to the outside of the cleaning tub 51 through the drain openings 53*a* and 54*a* and the suction unit 80 which is carrying on the suction operation, as shown in FIG. 8D.

Then, the control device 100 performs a process S27. In the process S27, the second suction controller 105 controls the suction device 82 of the suction unit 80 to stop the sucking of the cleaning liquid L2 from the suction opening 81*a*. If the cleaning liquid L2 is left within the cleaning tub 51 after the sucking of the cleaning liquid L2 from the suction opening 81*a* is stopped, the remaining cleaning liquid L2 is drained to the outside of the cleaning tub 51 through the suction openings 53*a* and 54*a*.

Subsequently, the control device 100 performs a process S28. In the process S28, the gas supply controller 107 controls the pump 72 and the valve 73 of the gas supply 70 to discharge the gas G toward the leading end surface 25*b* of the nozzle 25 from the nozzle 75 (see FIG. 2). In the process S27, a small amount of the cleaning liquid L2 may remain at the leading end surface 25*b*. In such a case, the remaining cleaning liquid L2 is blown away by the supplied gas G to be removed from the leading end surface 25*b*. Through these operations, the cleaning sequence is completed.

In the above-described series of processes of the cleaning sequence, the control device 100 may control the suction unit 80 to suck the cleaning liquid L2 in the whole period during which the cleaning liquid L2 is supplied into the cleaning tub 51 by the cleaning liquid supply 60 (hereinafter, referred to as "cleaning liquid supply period"). If the control device 100 controls the suction unit 80 to suck the cleaning liquid L2 in the cleaning tub 51 in a part of the cleaning liquid supply period as in the above-described cleaning sequence, a usage period of the suction device 82 is reduced, so that degradation of the suction device 82 is suppressed. Further, the control device 100 may control the suction unit 80 to suck the cleaning liquid L2 remaining in the cleaning tub 51 after the end of the cleaning liquid supply period. In case that the gas supply 70 is not provided in the liquid processing apparatus 1, the discharge of the gas G in the process S28 may be omitted.

[Dummy Discharging Sequence]

Figure 9:
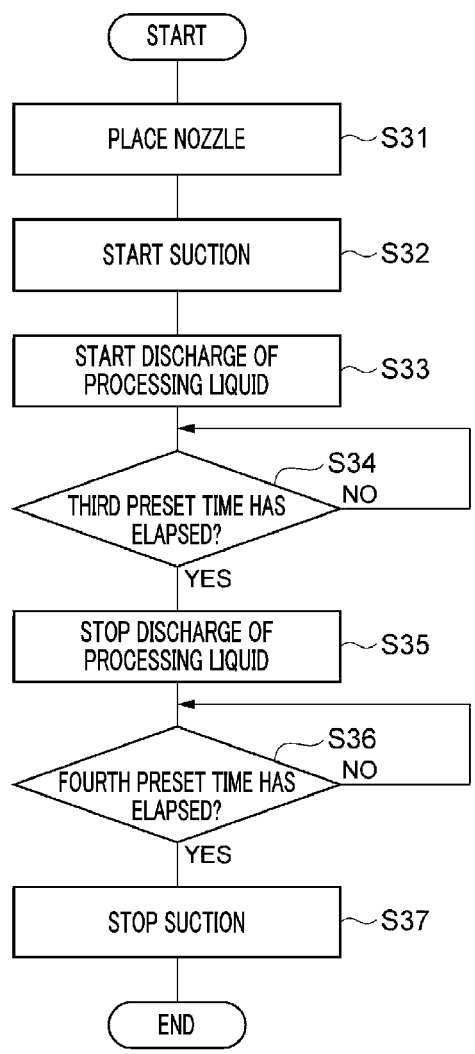
FIG. 9 is a flowchart illustrating an example of a dummy discharging sequence.

As depicted in FIG. 9, in the dummy discharging sequence of the process S03, the control device 100 performs a process S31 after the cleaning of the nozzle 25. In the process S31, the nozzle movement controller 106 controls the driving device 30 to move the nozzle 25 such that the discharge opening 25*a* of the nozzle 25 is located near the suction opening 81*a* of the suction head 81. That is, the nozzle movement controller 106 locates the nozzle 25 at a nearby position close to the suction opening 81*a* (see FIG. 10A).

Here, the nearby position close to the suction opening 81*a* refers to a position, at the standby position, where the discharge opening 25*a* and the suction opening 81*a* are close to each other to the extent that the processing liquid L1 discharged from the nozzle 25 is sucked through the suction opening 81*a* without being diffused to the leading end surface 25*b*. In this case, the nozzle movement controller 106 may locate the nozzle 25 at this nearby position such that a center of the discharge opening 25*a* and a center of the suction opening 81*a* are aligned with each other.

Then, the control device 100 performs a process S32. In the process S32, the first suction controller 104 controls the suction device 82 of the suction unit 80 such that the processing liquid L1 can be sucked through the suction opening 81*a*. That is, the first suction controller 104 begins the suction operation of the suction unit 80.

Thereafter, the control device 100 performs a process S33 and a process S34. In the process S33, the dummy discharging controller 101 controls the pump 22 and the valve 23 of the processing liquid supply 20 to allow the processing liquid L1 to be dummy-discharged from the discharge opening 25*a* of the nozzle 25. In the process S34, the control device 100 stands by until a third preset time elapses. Since the suction operation of the suction unit 80 is begun in the process S32, the dummy-discharged processing liquid L1 is sucked through the suction opening 81*a* (see FIG. 10B). In this way, the control device 100 controls the processing liquid supply 20 and the suction unit 80 such that, while the processing liquid L1 is being supplied from the nozzle 25 in the state that the nozzle 25 is located at the standby position, the processing liquid L1 discharged from the nozzle 25 is sucked by the suction unit 80. Accordingly, the dummy discharging of the processing liquid L1 is carried out, and the cleaning liquid L2 remaining within the nozzle 25 in the cleaning sequence is drained out from the nozzle 25.

Subsequently, the control device 100 performs a process S35. In the process S35, the dummy discharging controller 101 controls the pump 22 and the valve 23 of the processing liquid supply 20 to stop the dummy discharging of the processing liquid L1 from the discharge opening 25*a* of the nozzle 25. As a result, the discharge of the processing liquid L1 from the discharge opening 25*a* is stopped, and the processing liquid L1 left within the suction head 81 is removed by being sucked (see FIG. 10C).

Next, the control device 100 performs a process S36 and a process S37. In the process S36, the control device 100 stands by until a fourth preset time passes by. In the process S37, the first suction controller 104 controls the suction device 82 to create a state in which the suction of the processing liquid L1 from the suction opening 81*a* cannot be performed. That is, the first suction controller 104 stops the suction operation of the suction unit 80.

Figure 10A:
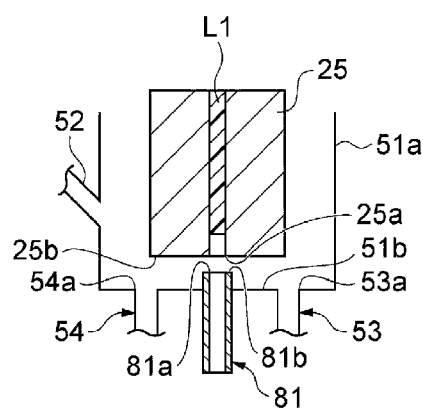
FIG. 10A to FIG. 10D are schematic diagrams for describing dummy discharging.
Figure 10B:
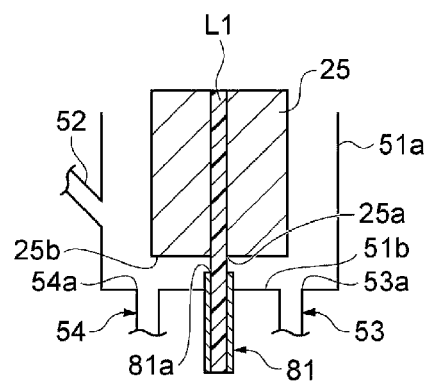
Figure 10C:
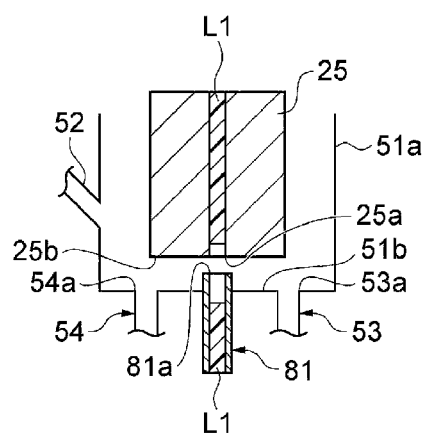
Figure 10D:
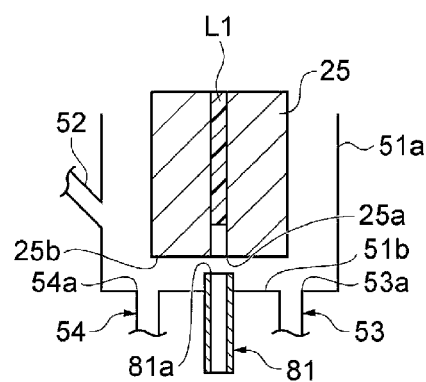

Accordingly, the suction through the suction opening 81*a* is continued during a period until the fourth preset time elapses after the discharge of the processing liquid L1 is stopped in the process S35. In the meanwhile, since the processing liquid L1 left within the nozzle 25 is sucked through the suction opening 81*a*, the processing liquid L1 within the nozzle 25 rises (or is "sucked back"), as shown in FIG. 10D. That is, a height position of the bottommost surface of the processing liquid L1 within the nozzle 25 rises. A rising amount of the processing liquid L1 within the nozzle 25 during a period until the suction operation through the suction opening 81*a* is stopped after the discharge of the processing liquid L1 from the nozzle 25 is stopped is varied by adjusting the fourth preset time. Through the above-described processes, the dummy discharging sequence is completed.

Further, in the above-described series of processes of the dummy discharging sequence, the control device 100 may stop the discharge of the processing liquid L1 from the nozzle 25 and the suction operation of the suction unit 80 at the substantially same time. Furthermore, the nozzle 25 may be placed at the aforementioned nearby position in the process S02 of the cleaning sequence which is performed before the dummy discharging sequence, and, then, the series of processes of the cleaning sequence may be carried out. In this case, the processing of the process S31 may be omitted in the dummy discharging sequence.

Effects of Exemplary Embodiments

The liquid processing apparatus 1 according to the exemplary embodiment as described above is equipped with the processing liquid supply 20 having the nozzle 25 configured to discharge the processing liquid L1; the driving device 30 configured to move the nozzle 25 between the coating position where the processing liquid L1 is supplied toward the surface Wa of the wafer W and the standby position different from the coating position; the suction unit 80 having the suction opening 81a opened toward the leading end surface 25b of the nozzle 25 located at the standby position; the cleaning unit 40 configured to clean the leading end surface 25b of the nozzle 25 at the standby position with the cleaning liquid L2; and the control device 100 configured to control the processing liquid supply 20, the driving device 30, the suction unit 80 and the cleaning unit 40. The control device 100 controls the processing liquid supply 20 to discharge the processing liquid L1 from the nozzle 25 in the state that the nozzle 25 is located at the standby position; controls the suction unit 80 to suck the processing liquid L1 which is discharged from the nozzle 25 located at the standby position; controls the cleaning unit 40 to supply the cleaning liquid L2 toward the standby position to clean the nozzle 25 which is located at the standby position; and controls the suction unit 80 to suck the cleaning liquid L2 which is supplied to the standby position by the cleaning unit 40.

The liquid processing method according to the exemplary embodiment includes moving the nozzle 25, which is provided in the processing liquid supply 20 and is configured to discharge the processing liquid L1, between the coating position for supplying the processing liquid L1 toward the surface Wa of the wafer W and the standby position different from the coating position; discharging the processing liquid L1 from the nozzle 25 of the processing liquid supply 20 in the state that the nozzle 25 is located at the standby position; sucking the processing liquid L1 discharged from the nozzle 25 located at the standby position, by using the suction unit 80 having the suction opening 81a opened toward the leading end surface 25b of the nozzle 25 which is located at the stand by position; supplying the cleaning liquid L2 toward the standby position to clean the nozzle 25 located at the standby position by using the cleaning unit 40 configured to clean the leading end surface 25b of the nozzle 25, which is located at the standby position, with the cleaning liquid L2; and sucking the cleaning liquid L2, which is supplied to the standby position by the cleaning unit 40, by using the suction unit 80.

In the liquid processing apparatus 1 and the liquid processing method described above, in the state that the nozzle 25 is located at the standby position, the processing liquid L1 is dummy-discharged from the nozzle 25 while being sucked by the suction unit. When the processing liquid L1 is dummy-discharged from the nozzle 25, there may be a concern that the discharged processing liquid L1 may attach to the leading end surface 25b of the nozzle 25. Since, however, the processing liquid L1 is sucked by the suction unit 80, it is difficult for the processing liquid L1 to adhere to the leading end surface 25b. Therefore, the adhesion of the processing liquid L1 to the leading end surface 25b of the nozzle 25, which might be caused by the dummy discharging from the nozzle 25, is suppressed. If the processing liquid L1 adheres to the leading end surface 25b due to the dummy discharging, the supply amount of the processing liquid L1 is increased when the discharge of the processing liquid L1 from the nozzle 25 toward the wafer W is begun. In such a case, there may be caused non-uniformity of the liquid processing by the processing liquid L1 within the surface of the wafer W. In the above-described configuration, however, since the adhesion of the processing liquid L1 to the leading end surface 25b is suppressed, it is possible to improve uniformity of the liquid processing by the processing liquid L1 within the surface of the wafer W.

Furthermore, when cleaning the leading end surface 25b of the nozzle 25 by using the cleaning liquid L2, the cleaning liquid L2 used for the cleaning is sucked in by the suction unit 80. Accordingly, the processing liquid L1 left within the suction unit 80 as a result of being sucked during the dummy discharging is removed. As a result, the suction effect by the suction unit 80 can be prolonged. As stated above, the liquid processing apparatus 1 and the liquid processing method according to the exemplary embodiment are effective to improve the uniformity of the liquid processing by the processing liquid L1 discharged from the nozzle 25 within the surface of the wafer W.

In the above-described exemplary embodiment, the control device 100 further controls the suction unit 80 to stop the suction of the processing liquid L1 through the suction opening 81a after controlling the processing liquid supply 20 to stop the discharge of the processing liquid L1 from the nozzle 25 located at the standby position. In this case, since the suction through the suction opening 81a is carried on even after the discharge of the processing liquid L1 from the nozzle 25 is stopped, the processing liquid L1 within the nozzle 25 rises as compared to when the discharge of the processing liquid L1 is stopped. By way of example, by adjusting a time period during which the suction by the suction unit 80 is continued after the discharge of the processing liquid L1 is stopped, it is possible to adjust the position (the height position of the bottommost surface) of the processing liquid L1 within the nozzle 25.

In the above-described exemplary embodiment, the cleaning unit 40 is equipped with the cleaning tub 51 provided at the standby position, and the cleaning liquid supply 60 configured to supply the cleaning liquid L2 into the cleaning tub 51. The suction opening 81a is opened within the cleaning tub 51. The control device 100 controls the cleaning liquid supply 60 to supply the cleaning liquid L2 into the cleaning tub 51 in the state that the nozzle 25 is accommodated within the cleaning tub 51, and controls the suction unit 80 to suck the cleaning liquid L2 which is supplied into the cleaning tub 51 by the cleaning liquid supply 60. In this case, in the state that the nozzle 25 is accommodated in the cleaning tub 51, the cleaning liquid L2 is supplied into to be stored in the cleaning tub 51. Therefore, since the leading end surface 25b of the nozzle 25 is kept immersed in the cleaning liquid L2, the processing liquid L1 adhering to the leading end surface 25b can be removed more securely. Furthermore, by sucking the cleaning liquid L2, which is stored in the cleaning tub 51, with the suction unit 80, the cleaning liquid L2 can be sent to the suction opening 81a efficiently.

In the above-described exemplary embodiment, the suction unit 80 is further equipped with the suction head 81 protruded above the bottom wall 51b of the cleaning tub 51. The suction opening 81a is opened at the top surface of the suction head 81. The cleaning liquid L2 may be left on the bottom wall 51b within the cleaning tub 51 after the nozzle 25 is cleaned. In this case, the cleaning liquid L2 used to clean the nozzle 25 may adhere to the leading end surface 25b of the nozzle 25 through the suction opening 81a. In the above-described configuration, however, since the suction head 81 is protruded above the bottom wall 51b, it is difficult for the cleaning liquid L2 used to clean the nozzle 25 to adhere to the suction opening 81a. Therefore, contamination of the leading end surface 25b of the nozzle 25 with the cleaning liquid L2 used to clean the nozzle 25 is suppressed.

The cleaning unit 40 further includes the liquid drain openings 53a and 54a which are provided at the bottom wall 51b of the cleaning tub 51 and through which the cleaning liquid L2 is drained to the outside of the cleaning tub 51. The liquid drain openings 53a and 54a are provided in the vicinity of the suction head 81. Since the suction head 81 is protruded above the bottom wall 51b, the cleaning liquid L2 may easily remain at a step-shaped portion formed by the bottom wall 51b and the surroundings of the leading end surface 81b of the suction head 81 even if the suction by the suction unit 80 is performed. In the above-described configuration, since the cleaning liquid L2 remaining at the stepped portion is drained through the liquid drain openings 53a and 54a, accumulation of the cleaning liquid L2 on the bottom wall 51b (stepped portion) is suppressed. Therefore, contamination of the leading end surface 25b of the nozzle 25 due to the accumulation of the cleaning liquid L2 can be suppressed.

The size of the liquid drain openings 53a and 54a is larger than the size of the suction opening 81a. In this case, the cleaning liquid L2 used to clean the nozzle 25 can be drained through the liquid drain openings 53a and 54a more quickly.

The diameter of the suction opening 81a is 0.7 times to 1.3 times as large as the diameter of the discharge opening 25a of the nozzle 25. If the diameter of the suction opening 81a is too small as compared to the diameter of the discharge opening 25a, it may not be possible to suck a part of the processing liquid L1 discharged from the discharge opening 25a into the suction unit 80, and a part of the processing liquid L1 which is not sucked may be diffused to the leading end surface 25b near the discharge opening 25a. Meanwhile, if the diameter of the suction opening 81a is too large as compared to the diameter of the discharge opening 25a, a liquid column of the processing liquid L1 formed between the discharge opening 25a and the suction opening 81a during the suction operation may be diffused to the extent that a diameter of the liquid column becomes equal to the diameter of the suction opening 81a. This diffusion of the liquid column (enlargement of a cross section thereof) may cause the processing liquid L1 to be attached to the leading end surface 25b near the discharge opening 25a. In the above-described configuration, since the diameter of the suction opening 81a is neither too small nor too large with respect to the diameter of the discharge opening 25a, the adhesion of the processing liquid L1 to the leading end surface 25b near the discharge opening 25a can be suppressed when the dummy discharging is performed.

According to the exemplary embodiment, it is possible to provide the liquid processing apparatus and the liquid processing method capable of improving in-surface uniformity of the liquid processing performed by using the processing liquid supplied from the nozzle.

So far, the exemplary embodiments have been described. However, it should be noted that the present disclosure is not limited to the above-described exemplary embodiments. Various changes and modifications may be made without departing from the scope of the present disclosure.

We claim:

1. A liquid processing apparatus, comprising:
a processing liquid supply including a nozzle configured to discharge a processing liquid;
a nozzle mover configured to move the nozzle between a coating position where the processing liquid is supplied toward a front surface of a substrate and a standby position different from the coating position;
a suction unit including a suction opening opened toward a leading end surface of the nozzle located at the standby position;
a cleaning unit configured to clean the leading end surface of the nozzle located at the standby position with a cleaning liquid; and
a control device configured to control the processing liquid supply, the nozzle mover, the suction unit and the cleaning unit,
wherein the control device controls the processing liquid supply to discharge the processing liquid from the nozzle in a state that the nozzle is located at the standby position,
the control device controls the suction unit to perform suction of the processing liquid which is discharged from the nozzle located at the standby position,
the control device controls the cleaning unit to supply the cleaning liquid toward the standby position to clean the nozzle which is located at the standby position, and
the control device controls the suction unit to suck the cleaning liquid which is supplied toward the standby position by the cleaning unit,
wherein the cleaning unit comprises a cleaning tub disposed at the standby position,
the suction unit further includes a suction head protruded above a bottom wall of the cleaning tub, and
the suction opening is opened at a top surface of the suction head.

2. The liquid processing apparatus of claim 1,
wherein the control device further controls the suction unit to stop the suction of the processing liquid through the suction opening after controlling the processing liquid supply to stop the discharge of the processing liquid from the nozzle located at the standby position.

3. The liquid processing apparatus of claim 1,
wherein the cleaning unit further comprises a cleaning liquid supply configured to supply the cleaning liquid into the cleaning tub,
the control device controls the cleaning liquid supply to supply the cleaning liquid into the cleaning tub in a state that the nozzle is accommodated within the cleaning tub, and
the control device controls the suction unit to perform suction of the cleaning liquid which is supplied into the cleaning tub by the cleaning liquid supply.

4. The liquid processing apparatus of claim 1,
wherein the cleaning unit further comprises a liquid drain opening which is provided at the bottom wall of the cleaning tub and through which the cleaning liquid is drained to an outside of the cleaning tub, and the liquid drain opening is located near the suction head.

5. The liquid processing apparatus of claim 4, wherein a size of the liquid drain opening is larger than a size of the suction opening.

6. The liquid processing apparatus of claim 1, wherein a diameter of the suction opening is 0.7 times to 1.3 times as large as a diameter of a discharge opening of the nozzle.

7. A liquid processing method using the liquid processing apparatus of claim 1, comprising:

moving the nozzle between the coating position and the standby position;

discharging the processing liquid from the nozzle by the processing liquid supply in the state that the nozzle is located at the standby position;

sucking the processing liquid discharged from the nozzle located at the standby position, by the suction unit;

supplying the cleaning liquid toward the standby position to clean the nozzle located at the standby position by the cleaning unit; and sucking the cleaning liquid, which is supplied toward the standby position by the cleaning unit, by the suction unit.

* * * * *